(12) United States Patent
Palacin et al.

(10) Patent No.: US 8,778,165 B2
(45) Date of Patent: Jul. 15, 2014

(54) METHOD OF FORMING AN ORGANIC FILM USING A GEL, SAID GEL AND USE THEREOF

(75) Inventors: Serge Palacin, Montigny le Bretonneux (FR); Brigitte Mouanda, Saint Arnault en Yvelines (FR)

(73) Assignee: Commissariat a l'Energie Atomique, Paris (FR)

( * ) Notice: Subject to any disclaimer, the term of this patent is extended or adjusted under 35 U.S.C. 154(b) by 1260 days.

(21) Appl. No.: 12/602,293

(22) PCT Filed: May 29, 2008

(86) PCT No.: PCT/EP2008/056617
§ 371 (c)(1),
(2), (4) Date: May 19, 2010

(87) PCT Pub. No.: WO2008/145696
PCT Pub. Date: Dec. 4, 2008

(65) Prior Publication Data
US 2010/0270166 A1   Oct. 28, 2010

(30) Foreign Application Priority Data
Jun. 1, 2007   (FR) ..................... 07 55424

(51) Int. Cl.
*C25D 9/02* (2006.01)
*C09D 5/44* (2006.01)
*C25D 13/04* (2006.01)
*C25D 13/06* (2006.01)
*C25D 13/08* (2006.01)

(52) U.S. Cl.
CPC ............... *C25D 9/02* (2013.01); *C09D 5/4476* (2013.01); *C25D 13/04* (2013.01); *C25D 13/06* (2013.01); *C25D 13/08* (2013.01)
USPC ........................................ 205/317; 205/157

(58) Field of Classification Search
CPC .......... C25D 9/02; C25D 13/04; C25D 13/06; C25D 13/08; C09D 5/4476
USPC .................................................. 205/317, 157
See application file for complete search history.

(56) References Cited

U.S. PATENT DOCUMENTS

2004/0081900 A1 * 4/2004 Bureau et al. ................... 430/31
2004/0248428 A1 * 12/2004 Bureau et al. ................ 438/780
(Continued)

FOREIGN PATENT DOCUMENTS

| FR | 2 871 162 A1 | 12/2005 |
| FR | 2 897 876 A1 | 8/2007 |
| WO | WO 03/018212 A1 | 3/2003 |

OTHER PUBLICATIONS

Kaneko et al., "Molecular Reactor for Solution Chemistry", Chemistry Letters 2002, XP008086665, Jan. 28, 2002, pp. 530-531.
A. Ulman, "An Introduction to Ultrathin Organic Films" from Langmuir-Blodgett to Self-Assembly, 1991 (Boston, Academic Press), pp. ix-xvii and 101-102.

(Continued)

*Primary Examiner* — Nicholas A Smith
(74) *Attorney, Agent, or Firm* — Miles & Stockbridge P.C.

(57) ABSTRACT

The invention relates to a process for forming a polymeric organic film on an electrically conductive or semiconductive surface by application of an electric potential between a gel, in contact with said surface, and said surface, the gel comprising (i) a protic solvent, (ii) compounds having colloidal properties, (iii) an adhesion primer, optionally (iv) a monomer and the potential applied being at least equal to the reduction potential of the adhesion primer. The invention also relates to said gel, to its use and to a kit for forming an organic film.

22 Claims, 12 Drawing Sheets

(56) References Cited

U.S. PATENT DOCUMENTS

2007/0289872 A1    12/2007    Deniau et al.
2008/0053835 A1*   3/2008     Kobata .................. 205/317
2008/0064783 A1    3/2008     Chehimi et al.

OTHER PUBLICATIONS

Palacin et al., "Molecule-to-Metal Bonds: Electrografting Polymers on Conducting Surfaces", ChemPhysChem Journal, 2004 (Wiley-VCH), pp. 1468-1481.

Zhang et al., "Studies of Arenediazonium Salts as a New Class of Electropolymerization Initiator", Journal of Applied Polymer Science, vol. 73, 1993 (John Wiley & Sons, Inc.), pp. 2265-2272.

Suzuki et al., "New Quasi-solid Materials as a Medium for Photochemical Reactions", Journal of Physical Chemistry, A2003, vol. 107, pp. 5523-5527.

Tamagawa et al., "Pores and Diffusion Characteristics of Porous Gels", Polymer, vol. 41 (2000), pp. 7201-7207.

Xia et al., "Soft Lithography", Angew. Chem. Int. Ed., vol. 37, 1998, pp. 550-575.

\* cited by examiner

METHOD OF FORMING AN ORGANIC FILM USING A GEL, SAID GEL AND USE THEREOF

TECHNICAL FIELD

The present invention relates to the field of organic surface coatings, said coatings being in the form of organic films. It relates more particularly to the use of a gel, as an electrochemical cell and of suitably selected solutions in order to enable the simple and reproducible formation of organic films by electrochemical grafting onto electrically conductive or semiconductive surfaces.

PRIOR ART

The chemical modification of metallic or semiconductive substrates is a field of research that has been very important for three decades. Over time, several surface modification methods have been proposed and evaluated.

The simplest process is the deposition of a solution of polymers by spin coating. This process does not require any particular affinity between the macromolecules and the substrate to be coated, and does not develop strong bonds between the surface and the polymers deposited.

The self-assembly of monolayers is also a technique which is very simple to implement (Ulman A., "*An introduction to ultrathin organic films from Langmuir-Blodgett films to self-assembly*", 1991, Boston, Academic Press). However, it requires the use of precursors generally molecular precursors that have a sufficient affinity for the surface of interest to be coated. Reference will then be made to a precursor-surface pair, such as sulphur compounds that have an affinity for gold or silver; trihalogeno-silanes for oxides such as silica or alumina; and polyaromatics for graphite or carbon nanotubes.

In each case, the formation of the film relies on a specific chemical reaction between a portion of the molecular precursor (the sulphur atom in the case of thiols for example) and some "receptor" sites of the surface. A chemisorption reaction provides the adhesion. However, the surfaces of interest to be coated generally display a mediocre stability due to the gradual desorption of the adsorbed species.

Another approach aims to form a covalent bond between the substrate to be coated and the modifying layer. Electrochemistry is a technique that enables this objective to be achieved (Palacin, S. et al., "Molecule-to-metal bonds: electrografting polymers on conducting surfaces". *Chem Phys Chem* 2004, 10, 1468-1481).

For many years, the grafting of a polymer film to a metallic surface was carried out by electropolymerization in a glovebox under an inert atmosphere. Specifically, this is often an anionic polymerization (reduction of monomers at the cathode) which imposes draconian conditions: an aprotic medium (anhydrous solvent and reactants) and the use of monomers having inert functions with respect to very basic anions. The monomers used belong to the family of acrylates or methacrylates, acrylonitriles or methacrylonitriles namely vinyl compounds that do not possess protic functions such as acid, alcohol, amine, etc. (Palacin S. et al., "*Molecule-to-metal bonds: electrografting polymers on conducting surfaces*.", Chem Phys Chem, 2004, 10, 1468).

It is also possible to use electrochemistry "indirectly" in order to generate radicals which will then allow the radical polymerization of a monomer (Zhang X. et al., "*Studies of arenediazonium salts as a new class of electropolymerization initiator*", J Appl Polym Sci 1999, 73, 2265).

Radical polymerization, widely used industrially, allows the synthesis of a wide variety of polymers coupled with the tolerance of a protic and aqueous medium.

The strategy of indirect electrografting therefore consists in combining both electroinitiation and radical polymerization in order to graft a polymer film to a metallic substrate. The illustration of this process is described in French patent application No. 06/01804, in which the electroinitiation makes it possible to create the radicals. Thus, the use of a diazonium salt, 4-nitrobenzenediazonium tetrafluoroborate (NBDT), results, by electrochemical reduction, in aryl free radicals capable of initiating the radical polymerization of a vinyl monomer in emulsion.

Despite the advantages that the most recent techniques have, their implementation today still remains tedious. The latter requires, in particular, the use of electrochemical baths which are often unsuitable for coating large-size surfaces, surfaces that are not very accessible and/or that are oriented so that the liquids run off their surface (bias surface, gravity effects), or else for precisely coating small-sized surfaces (up to nanoscale size) with precise patterns without the use of masks.

In quite another field, agarose gel is widely used in biochemistry for the electrophoresis of nucleic acids but also in immunoelectrophoresis for the separation of proteins. These water-swollen gels have also been used as novel reaction media for electrochemical reactions (Kaneko M. et al., "*Molecular reactor for solution chemistry*", Chem. Lett., 2002, 530) and photochemical reactions (Suzuki K. et al., "*New quasi-solid materials as a medium for photochemical reactions*", J. Phys. Chem. A 2003, 107, 5523).

The colloidal systems correspond to systems in which molecules having colloidal properties or particles having colloidal properties are dispersed in a continuous medium. The system is such that the molecules having colloidal properties or the particles having colloidal properties have at least one dimension, out of the three, between 1 nm and 1 µm, it is referred to as a colloidal dimension, or such that discontinuities exist within the system at distances of this order. It is not necessary for the three dimensions to be within this order of magnitude.

The continuous medium, or continuous phase, and the molecules having colloidal properties or the particles having colloidal properties which correspond to the dispersed phase, are each in a state which is specific to them. A particular nomenclature has been established, it is presented in Table (1) below.

TABLE 1

| | | Continuous phase | | |
|---|---|---|---|---|
| | | Gas | Liquid | Solid |
| Dispersed phase | Gas | | Foam | Solid foam |
| | Liquid | Liquid aerosol | Emulsion | Gel |
| | Solid | Solid aerosol | Sol | Solid sol |

SUMMARY OF THE INVENTION

The inventors have surprisingly observed that it was possible to use colloidal systems for which the continuous phase is solid and the dispersed phase is liquid, known by the term "gel", such as agarose gel, to override the problems encountered today in the field of electrografting. The present invention aims to avoid purely liquid media as a source of components for the preparation of an electrografted film by using a gel, as an electrochemical cell. To date, no article or patent relates to the use of gels, such as agarose gels, as an electrochemical cell for carrying out the electrografting of a polymer film onto an electrically conductive or semiconductive surface or for carrying out a localized grafting.

The invention consists, in particular, of the use of a colloidal system for which the continuous phase is solid and the dispersed phase is liquid, i.e. a gel, composed of a solvent and of compounds having colloidal properties, comprising a chemical species that may be chemisorbed via a radical route onto an electrically conductive or semiconductive surface, and to which a potential at least equal to the reduction potential of said chemical species is applied, in order to form an organic film on an electrically conductive or semiconductive surface.

The invention thus corresponds to a process for forming an organic film on an electrically conductive or semiconductive surface by application of an electric potential between a gel, in contact with said surface, and said surface, wherein the gel comprises:

a protic solvent;
at least one compound having colloidal properties;
at least one adhesion primer;
and wherein the potential applied is at least equal to the reduction potential of the adhesion primer.

Within the meaning of the invention, a gel corresponds in particular to a chemical system in which there is a three-dimensional network constituted of compounds having colloidal properties capable of forming a matrix which corresponds to a solid continuous phase. Such compounds may be of organic, inorganic or mixed nature. Thus, the system may also be of varied nature. When it is said to be "of organic nature", all of the compounds are of organic nature. When the compounds are of organic nature, they are generally macromolecules which, typically, are molecules of relatively high molecular weight, the structure of which is formed essentially from units having multiple repetitions derived, in fact or from a conceptual point of view, from molecules of low molecular weight. The most regularly used macromolecules are generally highly branched. Thus each constitutional unit is essentially linked to other constitutional units and to the boundary macroscopic phase by permanent channels through the entire macromolecule. The number of these channels increases with the average number of intermediate bonds; on average the channels are coextensive with the macromolecule. Typically, a gel is a soft and solvent-swollen material. Capable of undergoing large deformations, it is of elastic and plastic nature. Gels are generally formed from at least two constituents: the solvent which is a liquid "trapped" by a second compound which forms a three-dimensional net, or network, throughout the solvent. The compounds capable of forming gels have been studied for a long time and are known to a person skilled in the art.

The invention may be applied to numerous surfaces. Among the electrically conductive or semiconductive surfaces it is possible, non-exhaustively, to use a surface constituted of at least one of the following conductors or semiconductors: metals and their alloys with or without a surface oxide, transition metals, noble metals, iron, steel, such as 316 L stainless steel, copper, nickel, cobalt, niobium, aluminium, silver, titanium, titanium nitride, tungsten, tungsten nitride, tantalum, tantalum nitride, gold, platinum, iridium and irradiated platinum, silicon with or without its surface oxide, germanium with or without its surface oxide. According to one preferred embodiment of the invention, the surface used is a gold surface.

By "protic solvent", we mean, within the context of the present invention, a solvent which comprises at least one hydrogen atom capable of being released in proton form.

The protic solvent is advantageously chosen from the group consisting of water, and particularly deionized water, or distilled water, which are acidified or not; acetic acid; hydroxylated solvents such as methanol and ethanol; liquid glycols, particularly those of low molecular weight such as ethylene glycol, and mixtures thereof. In a first variant, the protic solvent used within the context of the present invention is constituted only by a protic solvent or by a mixture of various protic solvents. In another variant, the protic solvent or the mixture of protic solvents may be used as a mixture with at least one aprotic solvent, it being understood that the resulting mixture has the characteristics of a protic solvent and will in this regard be considered as such. Water is the preferred protic solvent, especially acidified water and, more particularly, acidified distilled water or acidified deionized water.

The term "adhesion primer" corresponds, within the context of the present invention, to any organic molecule capable, under certain conditions, of being chemisorbed at the surface of a solid support by radical reaction such as an electrochemical grafting and that comprises a function that is reactive with respect to another radical after chemisorption. Such molecules may be qualified as polymerizable insofar as, by radical reaction, they may result in the formation of molecules of relatively high molecular weight, the structure of which is formed essentially from a unit having multiple repetitions derived, in fact or from a conceptual point of view, from primer molecules. In such a case, the organic film formed according to the process of the invention will be able to be constituted solely of units derived from the adhesion primer.

The adhesion primer is advantageously a cleavable aryl salt chosen from the group consisting of aryl diazonium salts, aryl ammonium salts, aryl phosphonium salts and aryl sulphonium salts. In such salts, the aryl group is an aryl group which may be represented by R as defined below. These compounds are capable of forming a polymeric film as has been shown, for example, in the international application WO 03/018212.

Among the cleavable aryl salts, mention may, in particular, be made of the compounds of formula (I) below:

$$R\text{—}N_2^+, A^- \qquad (I)$$

in which:
A represents a monovalent anion; and
R represents an aryl group.

As the aryl group of the cleavable aryl salts and especially of the compounds of formula (I) above, mention may advantageously be made of the optionally monosubstituted or polysubstituted, aromatic or heteroaromatic carbon-based structures constituted of one or more aromatic or heteroaromatic rings each comprising from 3 to 8 atoms, the heteroatom(s) possibly being N, O, P or S. The substituent(s) may contain one or more heteroatoms, such as N, O, F, Cl, P, Si, Br or S and also in particular $C_1$ to $C_6$ alkyl groups.

Within the cleavable aryl salts and especially compounds of formula (I) above, R is preferably chosen from aryl groups substituted by electron-withdrawing groups such as $NO_2$, COH, ketones, CN, $CO_2H$, $NH_2$, esters and halogens. The R groups of aryl type that are particularly preferred are nitrophenyl and phenyl radicals.

Within the compounds of formula (I) above, A may especially be chosen from inorganic anions such as halides for instance I⁻, Br⁻ and Cl⁻, halogenborates such as tetrafluoroborate, and organic anions such as alcoholates, carboxylates, perchlorates and sulphonates.

As compounds of formula (I), it is particularly advantageous to use a compound chosen from the group consisting of phenyldiazonium tetrafluoroborate, 4-nitrophenyldiazonium tetrafluoroborate, 4-bromophenyldiazonium tetrafluoroborate, 4-aminophenyldiazonium chloride, 2-methyl-4-chlorophenyldiazonium chloride, 4-benzoylbenzenediazonium tetrafluoroborate, 4-cyanophenyldiazonium tetrafluoroborate, 4-carboxyphenyldiazonium tetrafluoroborate, 4-acetamidophenyldiazonium tetrafluoroborate, 4-phenylacetic acid diazonium tetrafluoroborate, 2-methyl-4-[(2-methylphenyl)-diazenyl]benzenediazonium sulphate, 9,10-dioxo-9,10-dihydro-1-anthracenediazonium chloride, 4-nitro-naphthalenediazonium tetrafluoroborate and naphthalenediazonium tetrafluoroborate.

Advantageously, in the case where the adhesion primer is an aryldiazonium salt and, preferably, an aryl salt of formula (I), the pH within the gel is less than 7, in particular less than 5 and typically less than or equal to 3. It is recommended to work at a pH between 0 and 3. If necessary, the pH within the gel may be adjusted to the desired value using one or more acidifying agents well known to a person skilled in the art, for example using mineral or organic acids such as hydrochloric acid, sulphuric acid, etc.

It is of course possible to use, by way of adhesion primer, simultaneously molecules of different structures considered individually as molecules of "adhesion primer" type. Thus, for example, a mixture of various adhesion primers as described previously and especially a mixture of different aryl diazoniums may be used.

The compounds having colloidal properties generally used for the preparation of gels, especially in biology, can be used in the context of the invention. The definitions given previously for the molecules and particles having colloidal properties also apply to the compounds having colloidal properties capable of being used within the context of the present invention. Among the compounds having colloidal properties, it is recommended to use compounds of organic nature. In this regard, it is possible to use organic polymers. Advantageously, the compounds having colloidal properties will have few ethylenic type bonds and preferably no ethylenic type bond. Therefore, it is preferable that the hydrocarbon-based chains borne by the compounds are saturated. It is possible, for example, to use macromolecules such as polysaccharides and, in particular, agarose, and more particularly agarose having a low melting point, typically 86±2° C., chitosan, xanthan, carrageenan, agar, alginate or mixtures thereof. It is in fact possible to use mixtures of two or more different polysaccharides such as a mixture of carrageenan and of agarose. Mention may also be made, by way of example, of the polyacrylamide which is formed by polymerization of acrylamide in the presence of a crosslinking agent. It is also possible to use a derivative of polyacrylamide.

It is preferable that the colloidal system is an elastomer gel. Thus, for example, among the polysaccharides, it is preferable to use agarose, and especially agarose having a low melting point which may have a sulphate content ≤0.12% and makes it possible to form, for example, a gel having a strength ≤3200 g/cm² starting from agarose at 1.5% (weight/volume) in a solvent, or else κ-carrageenan which has, within carrageenans, the most advantageous properties for forming a gel.

The amount of solvent which it is possible to use varies according to the wishes of the user and the properties which the user desires to attribute to the colloidal system. The maximum amount is linked to the compounds which provide the colloidal properties. In the case of compounds such as polysaccharides, it is generally recommended to prepare systems in which the polysaccharide/solvent ratio (weight/volume) is between 0.5 and 4%, typically 1.5 to 3%. It is for example possible to prepare an agarose gel in which the agarose/water ratio is 0.15 g to 0.4 g/10 ml.

The reduction potential of the adhesion primer can be easily determined by a person skilled in the art by using experimental techniques common in electrochemistry. The potential may be independently applied by polarization under linear or cyclic voltammetry conditions, under potentiostatic, potentiodynamic, intensiostatic, galvanostatic or galvanodynamic conditions or by simple or pulse chronoamperometry. It is advantageous for the potential to be applied by polarization under cyclic voltammetry conditions. In this case, the number of cycles will be especially between 1 and 1000, in particular between 1 and 50, and more particularly it will be close to 10. The potential is generally applied at least until the formation of a film that can be detected by standard surface analysis means such as those used in the experimental section.

According to one particular embodiment, the gel may moreover comprise at least one radically polymerizable monomeric organic species different from the adhesion primer, hereinafter known as "monomer". It is especially chosen from the monomeric species capable of polymerizing under radical conditions after initiation by a radical chemical entity. Typically, these are molecules comprising at least one bond of ethylenic type. Vinyl monomers, especially the monomers described in patent application FR 05 02516 and also in patent FR 03 11491, are particularly relevant.

Among the vinyl monomers, it is possible to use monomers of formula (II) below:

in which the $R_1$ to $R_4$ groups, which are identical or different, represent a non-metallic monovalent atom such as a halogen atom or a hydrogen atom, or a saturated or unsaturated chemical group, such as a carbon-based structure and especially an alkyl or aryl group, a —$COOR_5$ group in which $R_5$ represents a hydrogen atom or a $C_1$-$C_6$ alkyl, nitrile, carbonyl, amine or amide group.

Among the compounds of formula (II) above, mention may in particular be made of acrylic acid, vinyl acetate, acrylonitrile, methacrylonitrile, methyl methacrylate, ethyl methacrylate, butyl methacrylate, propyl methacrylate, hydroxyethyl methacrylate (HEMA), hydroxypropyl methacrylate, glycidyl methacrylate; acrylamides and especially amino-ethyl, propyl, butyl, pentyl and hexyl methacrylamides, cyanoacrylates, diacrylates and dimethacrylates, triacrylates and trimethacrylates, tetraacrylates and tetramethacrylates (such as pentaerythritol tetramethacrylate), styrene and its derivatives, para-chlorostyrene, pentafluoro-styrene, N-vinyl pyrrolidone, 4-vinyl pyridine, 2-vinyl pyridine, vinyl, acryloyl or methacryloyl halides, and di-vinylbenzene (DVB), and more generally the vinyl cross-linking agents or cross-linking agents based on acrylate, methacrylate, and derivatives thereof.

The preferred vinyl monomers are butyl methacrylate and acrylic acid. The monomer concentration in the system is variable as a function of the desire of the user. It is preferable that this concentration is between 1 and 11 M and preferably between 1 and 5M, typically 3.7M.

This embodiment makes it possible to prepare an organic film from two types of different chemical species: the adhesion primers, such as the aryl diazonium salts, and the monomers, such as the vinyl monomers. Typically an initiation layer constituted of a derivative of the adhesion primer is formed and allows the formation of a polymeric film derived essentially from the monomer. Thus, the organic film within the context of the invention has a sequence of "molecular" units in which the first unit is constituted by a derivative of the adhesion primer, the other units being either derived from the adhesion primers or from the monomer. Typically, one aryl diazonium salt which is used will form a layer of primer derivative on the treated surface and the vinyl species will react on this layer.

By "derivative of the adhesion primer", we mean within the context of the present invention, a chemical unit resulting from the adhesion primer, after the latter has reacted via radical chemical grafting, especially with the surface of the solid support used within the context of the present invention. It is clear to a person skilled in the art that the function that is reactive with respect to another radical after chemisorption of the derivative of the adhesion primer is different from the function involved in the covalent bond with the surface of the solid support. A polymeric film is derived "essentially" from the monomer in the sense that it may optionally comprise, in its structure, chemical entities derived from molecules of adhesion primer.

It is of course possible to simultaneously use several monomers of different structure and especially in the form of a mixture of vinyl monomers. It is thus possible to form films which are generally qualified as copolymeric films.

Advantageously, the compounds having colloidal properties will have a negligible reactivity with the adhesion primer and the monomer. Thus, for example, it is not recommended to use a polyacrylamide gel when acrylic acid is present as a radically polymerizable monomeric organic species. Specifically, this monomer may react with the amine functions of the acrylamide with formation of imide (—CO—NH—CO—) functions. Under these conditions, in order to ensure a better yield, a gel prepared from polysaccharides, especially agarose, will then be preferred. A person skilled in the art is able to determine the parasite reactions likely to reduce the efficacy of the process and the substitution of one type of compound having colloidal properties with another is within his reach. It may be useful to test various compounds having colloidal properties for one and the same type of adhesion primer and optional radically polymerizable monomeric organic species different from the adhesion primer, in order to determine the most suitable compounds having colloidal properties.

According to one particular embodiment of the invention, it is recommended that the gel contains a surfactant, especially when the monomer has a solubility in the protic solvent of less than $10^{-2}$M. A precise description of the surfactants that can be used within the context of the invention is given in patent applications FR 06 01804 and FR 06 08945. Surfactants are molecules that comprise a lipophilic (apolar) part and a hydrophilic (polar) part. Among the surfactants that can be used according to the invention, mention may especially be made of:

i) anionic surfactants, the hydrophilic part of which is negatively charged; they are preferably chosen from the compounds of formula (III) below:

$$R_6\text{-}A^-,\text{Cat}^+ \qquad (III)$$

in which:
$R_6$ represents a $C_1$-$C_{20}$, preferably $C_1$-$C_{14}$, and more preferably $C_5$-$C_{14}$ aryl or alkyl group;
$A^-$ is an anion chosen from sulphonates, sulphates, phosphates, carboxylates, sulphosuccinates, etc.; and
$Cat^+$ is a cationic counterion, preferably chosen from the ammonium ion ($NH_4^+$), quaternary ammoniums such as tetrabutylammonium, and alkali metal cations such as $Na^+$, $Li^+$ and $K^+$;

ii) cationic surfactants, the hydrophilic part of which is positively charged; they are preferably chosen from quaternary ammoniums of formula (IV) below:

$$(R_7)_4\text{—}N^+,An^- \qquad (IV)$$

in which:
the $R_7$ groups, which are identical or different, represent an aliphatic chain, for example a $C_1$-$C_{20}$, preferably $C_1$-$C_{14}$, and more preferably $C_5$-$C_{14}$ alkyl chain, or aromatic chain;
$An^-$ is an anionic counterion chosen, in particular, from derivatives of boron such as tetrafluoroborate or halide ions such as $F^-$, $Br^-$, $I^-$ or $Cl^-$;

iii) zwitterionic surfactants which are neutral compounds that have formal electric charges of one unit and of opposite sign; they are preferably chosen from the compounds of the formula (V) below:

$$Z^-\text{—}R_8\text{—}Z^+ \qquad (V)$$

in which:
$R_8$ represents a $C_1$-$C_{20}$, preferably $C_1$-$C_{14}$, and more preferably $C_5$-$C_{14}$ alkyl chain;
$Z^-$ represents a negatively charged function borne by $R_8$, preferably corresponding to a sulphate or a carboxylate; and
$Z^+$ represents a positively charged function, preferably an ammonium;

iv) amphoteric surfactants which are compounds that behave both as an acid or as a base depending on the medium in which they are placed; these compounds may have a zwitterionic nature, amino acids are one particular example of this family;

v) neutral (non-ionic) surfactants: the surfactant properties, especially the hydrophilicity, are provided by uncharged functional groups such as an alcohol, an ether, an ester or else an amide, containing heteroatoms such as nitrogen or oxygen; due to the low hydrophilic contribution of these functions, non-ionic surfactant compounds are usually polyfunctional.

The charged surfactants may of course bear several charges.

Among the various meanings of the aryl group of the $R_6$ group from the compounds of formula (III) above, mention may especially be made of the substituted or unsubstituted phenyl ring, and among the various meanings of the $R_6$ alkyl group, the $C_1$-$C_{20}$, preferably $C_1$-$C_{14}$, and more preferably $C_5$-$C_{14}$ alkyl chains.

As the compound of formula (III), it is preferred to use tetraethylammonium para-toluenesulphonate, sodium dodecylsulphate (SDS), sodium palmitate, sodium stearate, sodium myristate, sodium di(2-ethylhexyl)sulphosuccinate, methylbenzene sulphonate and ethylbenzene sulphonate.

Among the various meanings of the $R_7$ groups of the quaternary ammoniums of formula (IV) above, mention may especially be made of methyl, ethyl, propyl, butyl and tetradecyl groups.

As the compound of formula (IV), it is preferred to use tetradecyltrimethylammonium bromide (TTAB), alkylpyridinium halides bearing a $C_1$-$C_{18}$ aliphatic chain and alkylammonium halides.

As a zwitterionic surfactant, mention may especially be made of sodium N,N-dimethyldodecylammonium butanate, sodium dimethyldodecylammonium propanate and amino acids.

As an amphoteric surfactant, mention may especially be made of disodium lauroamphodiacetate, betaines such as alkyl amidopropyl betaine or lauryl hydroxy sulphobetaine.

As a non-ionic surfactant, mention may in particular be made of polyethers, for instance polyethoxylated surfactants such as, for example, polyethylene glycol lauryl ether (POE23 or Brij© 35), polyols (surfactants derived from sugars), in particular glucose alkylates such as, for example, glucose hexanate.

The surfactants that can be used according to the invention are also emulsifiers, i.e., when they are present in small amounts, they facilitate the formation of an emulsion or increase the colloidal stability by reducing the aggregation rate or the coalescence rate or both. Measurements of one or the other of the rates according to techniques known to a person skilled in the art such as the measurement of the size of the drops by light scattering will be able to allow the best emulsifier among the surfactants recommended in each of the cases to be determined from a solution used in the gel.

Among the preferred surfactants according to the invention, mention may be made of anionic surfactants such as sulphonates, quaternary ammoniums and non-ionic surfactants such as polyoxyethylenes.

The advantage of the surfactant lies in its capacity to form micelles in the solvent which promote the growth of macroradicals, by isolating them from the external medium, then ensuring the growth of the film. In this regard, mention may especially be made of sodium dodecyl sulphate (SDS) and the polyglycol lauryl ether (Brij 35®). The minimum amount of surfactant needed to solubilize a compound in a solution may be easily determined by sampling solutions of identical composition but of variable surfactant concentration and by observing the effect produced by the surfactant. Generally, it is recommended that the surfactant concentration in the solvent of the gel is such that the monomer critical micelle concentration (CMC) is achieved. The CMC of a surfactant may be determined by methods known to a person skilled in the art, for example by surface tension measurements.

The surfactant concentration within the solution of protic solvent is typically at least equal to the CMC and generally between 0.5 mM and 5M approximately, preferably between 0.1 mM and 150 mM approximately. The recommended surfactant concentration is usually 5 mM. Typically, the amount of surfactant will be between $\frac{1}{20}$ and $\frac{1}{150}$ of that of the monomer and preferably it will be close to $\frac{1}{100}$.

The gel may comprise at least one electrolyte which may especially be chosen from quaternary ammonium salts such as perchlorates, tosylates, tetrafluoroborates, hexafluorophosphates, quaternary ammonium halides, sodium nitrate and sodium chloride. It is recommended to use an electrolyte when the gel is not sufficiently conductive to allow efficient grafting. It is possible to carry out prior measurements in order to determine the benefits linked to the electrolyte depending on the compounds present in the gel. When the solvent used is an organic solvent, it is recommended to use an electrolyte.

Among these quaternary ammonium salts, mention may in particular be made, by way of example, of tetraethylammonium perchlorate (TEAP), tetrabutylammonium perchlorate (TBAP), tetrapropylammonium perchlorate (TPAP), benzyltrimethylammonium perchlorate (BTMAP) and tetraethylammonium tetrafluoroborate.

The process may moreover comprise a step of preparing the colloidal system. Thus, according to one particular embodiment of the invention, the process comprises the following supplementary steps:

preparation of a gel from at least one compound having colloidal properties and from a protic solvent;

diffusion of at least one adhesion primer, and optionally of at least one monomer, in the gel.

The step of preparing the colloidal system depends on the compounds used and is known in the corresponding field. It is generally carried out by putting the compounds into solution, then forming the system. The system may form spontaneously. Regarding the chemical compounds, such as the polysaccharides, it is generally necessary to carry out a heating then a cooling of the solution constituted of the solvent and of the compounds. The heating ensures the dispersion of the molecules in the solution and makes it possible to break some of the weak bonds that exist between the various molecules, which can then reorganize themselves to form a network. The colloidal system appears during the cooling of the solution. As regards, for example, polyacrylamide gels, the formation of the gel requires the use of a crosslinking agent and of acrylamide.

The diffusion step is generally carried out by bringing a solution of the protic solvent comprising the adhesion primer, and the optional monomer, into contact with the previously prepared gel. The solvent used for the preparation of the gel may be different from the protic solvent, it is however recommended that it is also protic, advantageously it will be the same solvent. The contacting step typically corresponds to the immersion of the gel in the solution.

The time required to carry out the diffusion depends of course on the system which is used, both its volume and the compounds used, and the optimal modalities can be determined by a person skilled in the art by simple experimental tests. In this regard, it is recommended to refer to the examples below which illustrate this aspect of the invention. For a colloidal system produced from polysaccharide, such as agarose, using a predominantly aqueous solvent, and especially pure water, with 0.1 to 0.5 g of compounds having colloidal properties in a compounds/solvent ratio between 1.5 and 2% (weight of compound/volume of solvent), a contacting time between 30 min and 4 h is recommended.

Typically, the solution which is brought into contact with the gel will have a concentration of adhesion primer and of optional monomer equal to that at which the user desires to carry out the grafting, such values are set out above.

According to another particular embodiment, the gel may be prepared in a single step. For this, it is desirable to directly add the adhesion primer, and the optional monomer, during the preparation of the colloidal system. The process will then comprise a step of preparation of a gel from at least one compound having colloidal properties, from a protic solvent, from at least one adhesion primer, and optionally from at least one monomer. Thus, for example, it is sufficient to integrate the adhesion primer, and the optional monomer, into a solution of polysaccharide in a protic solvent, then to prepare the gel in order to obtain the gel described above that makes it possible to form an organic film.

During the preparation of the gel, whether it is carried out in one or two steps, it is of course possible to add one or more other elements such as surfactants; an acid, typically in order to stabilize the diazonium salts; electrolytes which could be used in the electrochemical solution as described above; and crosslinking agents. Advantageously, the colloidal system will be prepared under an inert atmosphere. Preferably, the solutions used will undergo sparging using an inert gas such as argon, this generally making it possible to increase the effectiveness of the formation of the film.

The pH of the colloidal system may vary and it is useful to set it during its preparation. The person skilled in the art will of course be capable of determining the most suitable compounds having colloidal properties, i.e. those which are not impaired under the chosen conditions, depending on the pH which will have been chosen.

It is advantageous to give the colloidal system a chosen morphology, and preferably a morphology adapted to the surface with which it is brought into contact. The morphology of the system is often produced during the preparation of the colloidal system. It is, for this purpose, possible to use particular moulds corresponding to the shape that the user desires to give to the system. It is also possible to model, after its preparation, the colloidal system obtained using suitable tools such as blades. The colloidal system may thus have a contact surface of original form and may, for example, correspond to alphanumeric characters or ideograms. The contact surface may be continuous or discontinuous, the morphology determining the location of the potential contacts. Thus, the system may have a contact surface with the surface on which the film must be formed, which is discontinuous at variable and both microscopic and nanometric scales. Advantageously, the contact surface will have the topology of an electronic circuit.

The process may be carried out over a wide range of temperatures. It is however recommended not to exceed the temperature that corresponds to the gel point and not to go below the solidification temperature of the solvent used. The process will generally be carried out at ambient temperature, namely around 20-30° C.

The invention also relates to a gel comprising a protic solvent, at least one compound having colloidal properties, at least one adhesion primer and optionally at least one monomer, such as have been defined above. The gel may also comprise one or more supplementary species, for example electrolytes, surfactants, crosslinking agents, as emerges from the summary which has been made. The gel will advantageously comprise the species described for carrying out the process, it may, for example, comprise several types of adhesion primer and also several types of monomers.

The invention also relates to the use of a gel as defined previously as an electrochemical cell for carrying out the electrografting of an organic film on an electrically conductive or semiconductive surface or for carrying out a localized grafting.

The invention also relates to a kit for the formation of an organic film on an electrically conductive or semiconductive surface, such a kit is suitable for the implementation of the process explained above. Such a kit especially comprises a gel as defined above, the gel generally being structured by at least one compound having colloidal properties and a protic solvent, as described previously. It also comprises at least one adhesion primer and optionally at least one monomer as defined previously. Supplementary species, for example electrolytes, crosslinking agents or surfactants, as emerges from the summary which has been made may of course be present in the kit.

According to one particular embodiment, the solvent, the adhesion primer and the monomer are contained in the gel. According to another embodiment, the gel and the adhesion primer, with the optional monomer, solvated by the protic solvent are physically separate. Such a separation may generally be expressed in the form of separate packagings. It is possible, in this case, that the gel contains a protic solvent different from the protic solvent in which the adhesion primer, and the optional monomer, are dissolved. Regarding the application of the film formation process, reference will usefully be made to what was described above. Typically, the formation kit will comprise a gel, constituted of a protic solvent and of at least one compound having colloidal properties, physically separate from a solution of at least one adhesion primer, with optionally at least one monomer, in an identical or different protic solvent. It is clear that the protic solvent, compound having colloidal properties, adhesion primer and monomer are as defined previously.

The kit may also comprise electrical means capable of generating a voltage. Typically, it may be a battery equipped with a variable-voltage regulator which will make it possible to generate a voltage up to a value of 2 V.

The invention especially makes it possible to prepare, by grafting, organic films, such as polymer coatings, on a surface, for example a metallic surface, regardless of its size, in both a horizontal and a vertical position and in the absence of a bath and more particularly in the absence of a container such as an electrolysis tank. Moreover, the process may be used with non-polluting solvents such as water. The films obtained are of variable constitutions and their properties may be adjusted according to the nature of the adhesion primer(s) and that of the optional monomers which are used.

It also makes it possible to produce patterns or to carry out a localized grafting on a surface having a scale that varies from meters, such as the bodywork of a vehicle, to nanometers, such as electronic circuits (nanoprinting), with great ease.

Furthermore, the gel described in the invention is reusable. It is thus possible to "recharge" it, especially with adhesion primer, and with the optional monomer, by diffusion as has been explained above. Thus, economically, a gel whose morphology is adapted to a surface may be used a large number of times since it suffices to recharge it when it no longer contains enough adhesion primer, and optional monomers. Such a gel is particularly advantageous for coating a series of identical surfaces with organic film, with a high reproducibility.

The invention will be better understood on reading the figures and examples that follow. The purpose of these is not to limit the invention in its applications, but merely to illustrate here the possibilities offered by this new development of the art.

DETAILED SUMMARY OF PARTICULAR EMBODIMENTS

The examples set out below were carried out using a colloidal system produced at reduced cost from a commercially available polysaccharide. Water was used as the solvent insofar as it is suitable for this type of system and that it represents an ideal solvent within the context of non-polluting chemistry. Alternatively, the process was also applied in the presence of organic solvent.

As a surface of interest, it was decided to use a gold surface, in particular since this is an inert substrate which is easy to store under standard atmospheric conditions without observing any impairment. The gold surface was prepared by evaporation in order to form a thin film of polymicrocristalline gold (approximately 150 nm in thickness) with a chromium sublayer of 5 nm on a glass support.

The surfaces of interest obtained according to the process have films of high homogeneity and of high quality which withstand cleaning with various organic solvents such as acetone, DMF or acetonitrile under ultrasound treatment.

EXAMPLE 1

Preparation of the Aqueous Colloidal System

Preparation of a Simple Gel
Agarose Gel

Agarose is a polymer (polysaccharide) of galactose. At low concentration in water (1 to 3% weight/volume), it forms very porous solid gels. Its low-temperature gelling is due to the formation of a multitude of hydrogen bonds between the galactose molecules.

The gel was prepared according to a standard procedure. 20 ml of deionized water and 0.3 g of low melting point (86±2° C.) agarose with a sulphate content ≤0.12% were poured into a beaker equipped with a magnetic stirrer bar. The beaker, covered with parafilm (in order to avoid evaporation of the water and to keep the agarose concentration constant), was then immersed in a heated water bath. The gel prepared has a concentration of 1.5% weight/volume relative to the solvent.

The solution remained cloudy up to 78° C., then above this temperature it became clear. The heating was stopped at around 93° C. When the temperature of the water bath reached 65° C., the solution contained in the beaker was decanted into a 50 ml beaker, previously warmed by a hot air gun in order to slow down the formation of the gel. The gel was formed when the temperature decreased. The gel obtained had a strength ≥3200 g/cm$^2$, according to the specifications of the supplier.

The gel (1) was then immersed for 3 hours in a freshly prepared electrochemical solution then deposited on absorbent paper for a few seconds, and placed on a gold surface which was subsequently used as a cathode (2) in the context of the process.

Figure 1:
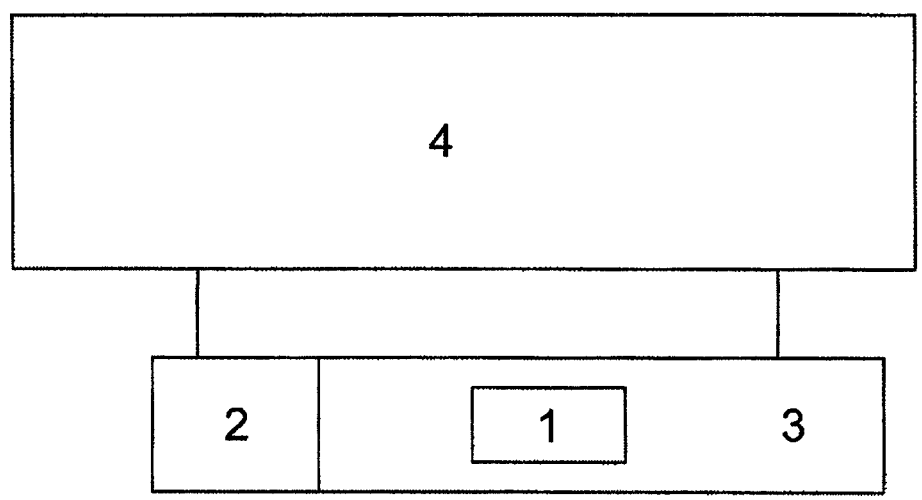
FIG. 1 is a schematic representation of the electrochemical assembly that implements the invention.

In order to implement the process, it was chosen to use an anode (3) constituted of a graphite foil, the reference electrode was short-circuited to the anode. The potential indicated (on the potentiostat (4)) corresponds to a potential difference between the two electrodes and not to the actual potential of the cathode. The assembly is represented in FIG. 1.

Polyacrylamide Gel

The synthesis of a porous polyacrylamide gel is simple (Tamagawa H. et al., "Pores and diffusion characteristics of porous gels", Polymer, 2000, 41, 7201). 50 g of deionized water, acrylamide (the monomer, 5.78 g (1.6M)), N,N-methylenebisacrylamide (the crosslinker, 0.0755 g (9.8×10$^{-3}$M)), N,N,N',N'-tetramethylethylenediamine (the accelerator, 0.0308 g (5.3×10$^{-3}$M)) and ammonium persulphate (the initiator, 0.080 g (7×10$^{-3}$M)) were introduced into a beaker. This mixture was then heated at 80° C. in a water bath for 30 minutes. The gel formed rapidly.

A fraction of gel synthesized according to the protocol described previously (rectangle of 1 cm by 2 cm and 1 cm in thickness) is immersed in an electrochemical solution for 30 minutes. The process is carried out as indicated for the agarose gel.

Synthesis of a Gel that Directly Contains the Reactive Species 10 ml of deionized water, 0.15 g of low melting point agarose (see above) and 3 ml (2M) of hydroxyethyl methacrylate (HEMA) were poured into a beaker equipped with a magnetic stirrer bar. The beaker, covered with parafilm, was immersed in a heated waterbath. As in the previous example, the heating was stopped at 93° C. When the temperature of the waterbath reached 65° C., the solution was then decanted into a 50 ml beaker warmed using a hot air gun. The gel was then immersed for 30 minutes in the aqueous solution containing 65 mg ($2.7 \times 10^{-2}$M) of 4-nitrophenyldiazonium tetrafluoroborate (NBDT) and a drop of $H_2SO_4$ in the presence of argon sparging.

EXAMPLE 2

Polymeric Film from an Adhesion Primer

The simple agarose gel as prepared in Example 1 was immersed in an aqueous solution of NBDT.

The electrochemical solution was produced by dissolving 75 mg ($3 \times 10^{-2}$M) of NBDT in 10 ml of water with stirring. In order to guarantee the stability of this salt, the pH of the solution was set at around 2 by addition of sulphuric acid.

For the study of the electrochemical behaviour of the gel containing NBDT in the electrochemical solution, 10 sweeps from +0.04 V to −0.6 V with a sweep rate of 20 mV/s were carried out.

Figure 2A:
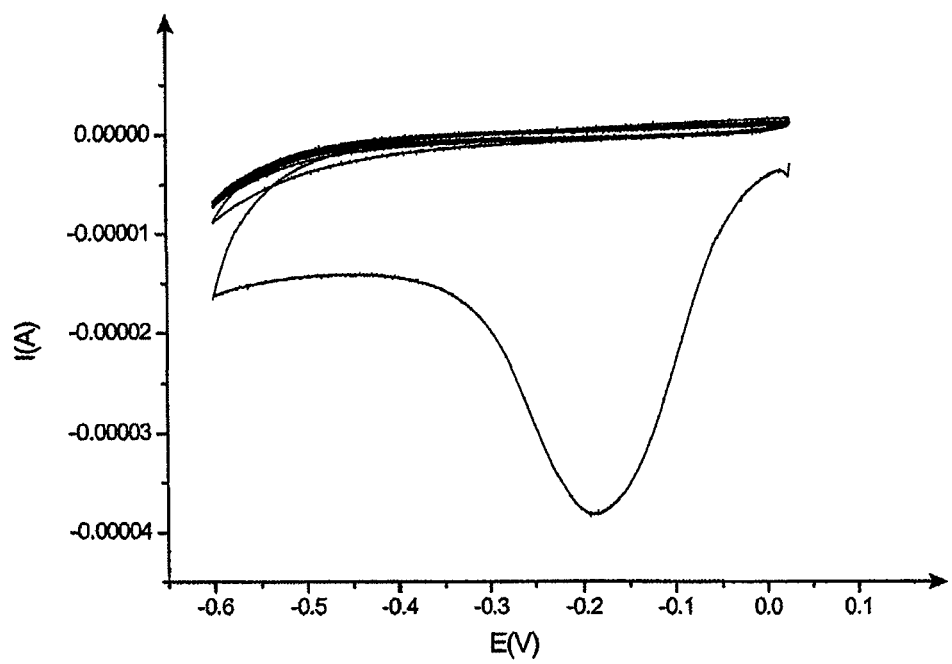
FIG. 2 presents a voltammogram of an aqueous gel, containing 4-nitrobenzenediazonium tetrafluoroborate (NBDT), in contact with a gold surface (FIG. 2a) and a Fourier transform infrared (FTIR) spectrum of the surface of the gold plate after electrolysis in the presence of the aqueous agarose gel containing NBDT (FIG. 2b).
Figure 2B:
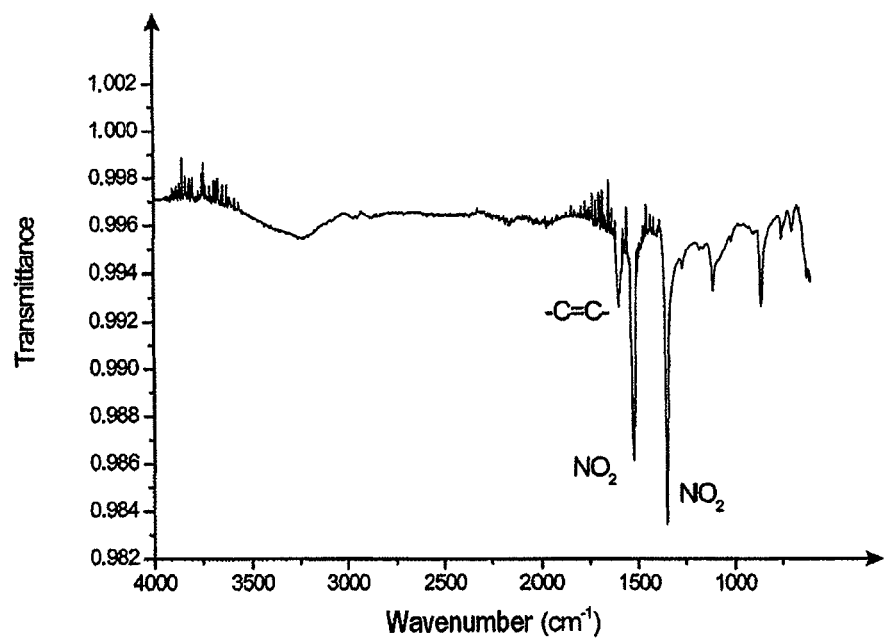

The voltammogram recorded is represented in FIG. 2a and the Fourier transform infrared (FTIR) spectrum of the grafted film is represented in FIG. 2b. The reduction of the $N_2^+$ groups is observed at −0.187 V during the first voltage sweep (FIG. 2a). In the spectrum of the polynitrophenylene film grafted to the gold plate after washing in the water with ultrasound treatment for 2 minutes (FIG. 2b), the $NO_2$ bands characteristic of the NBDT are clearly visible at 1524 and 1350 cm$^{-1}$.

Figure 3:
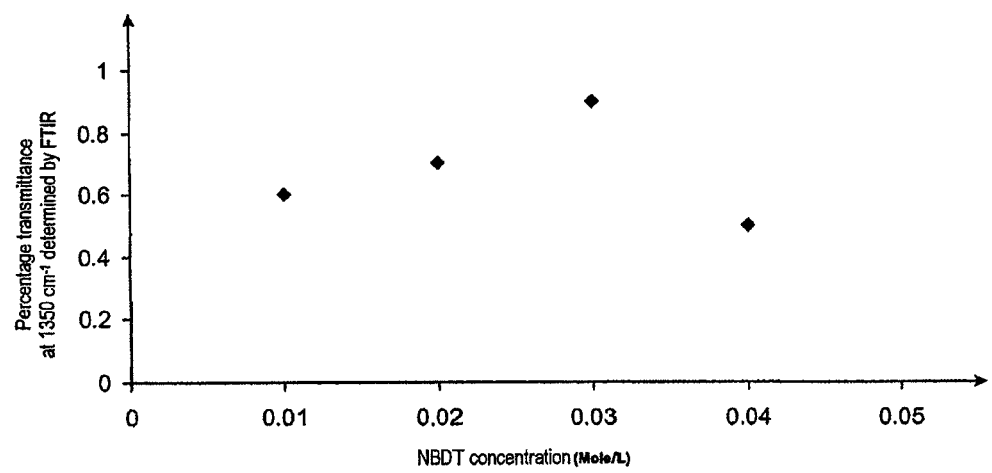
FIG. 3 presents the variation in the thickness of the grafted film (estimated from the percentage transmittance determined by FTIR) as a function of the concentration of NBDT.

The optimization of the concentration of diazonium salt, for obtaining films of variable thickness, was carried out and various concentrations were studied. The curve presented in FIG. 3 represents the relationship between the thickness of the film and the diazonium concentration. The thickness is estimated from the percentage of transmittance determined by FTIR for the infrared absorption band of the nitro group at 1350 cm$^{-1}$ as a function of NBDT concentration. The largest thickness was determined here for a diazonium salt concentration of around $3 \times 10^{-2}$M.

The use of a monomer of a single species such as the diazonium salt as presented in Example 2 leads to the formation of a polynitrophenylene film that only contains a single species of electrografted monomer.

EXAMPLE 3

Polymeric Film from an Adhesion Primer and from a Monomer

Acrylic Acid in the Presence of the Diazonium Salt with an Agarose Gel

A new electrochemical solution was produced by dissolving 73 mg ($2.3 \times 10^{-2}$M) of NBDT in 10 ml of water with stirring, then 3.45 ml (3.7M) of acrylic acid were added. An agarose gel, obtained according to the methods presented in Example 1 was immersed in this solution for 30 minutes, in the presence of argon sparging.

For the electrochemical study, 10 sweeps from −0.1 V to −1.8 V were carried out with a sweep rate of 10 mV/s. The voltammogram obtained is represented in FIG. 4a and the FTIR spectrum, taken after having subjected the plate to ultrasound treatment for 2 minutes in water, is given in FIG. 4b.

Figure 4A:
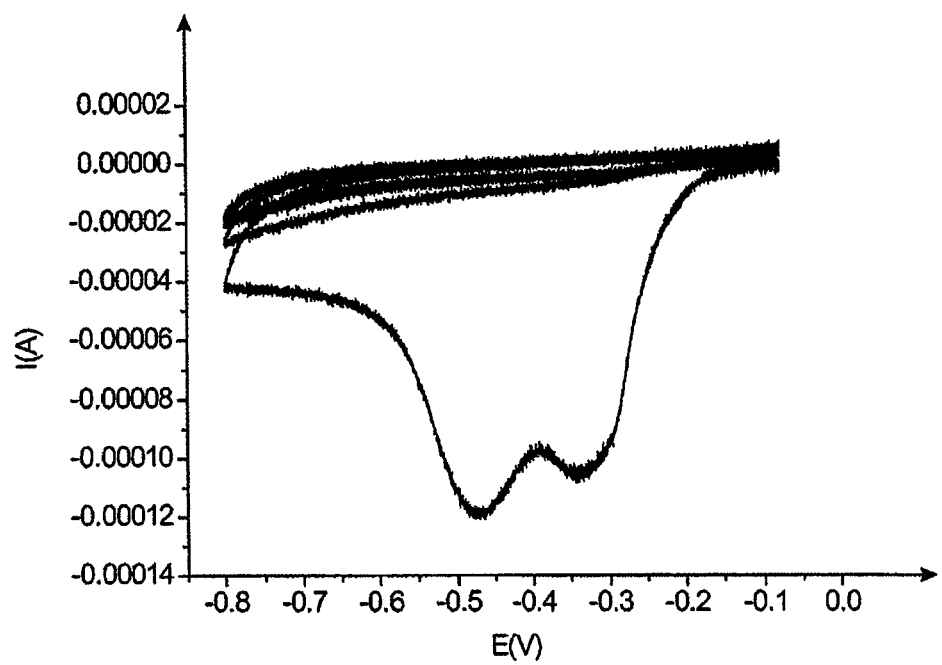
FIG. 4 presents a voltammogram of an aqueous gel, containing acrylic acid and NBDT, in contact with a gold surface (FIG. 4a) and an FTIR spectrum of the surface of the gold plate after electrolysis in the presence of an aqueous agarose gel containing acrylic acid and NBDT (FIG. 4b).
Figure 4B:
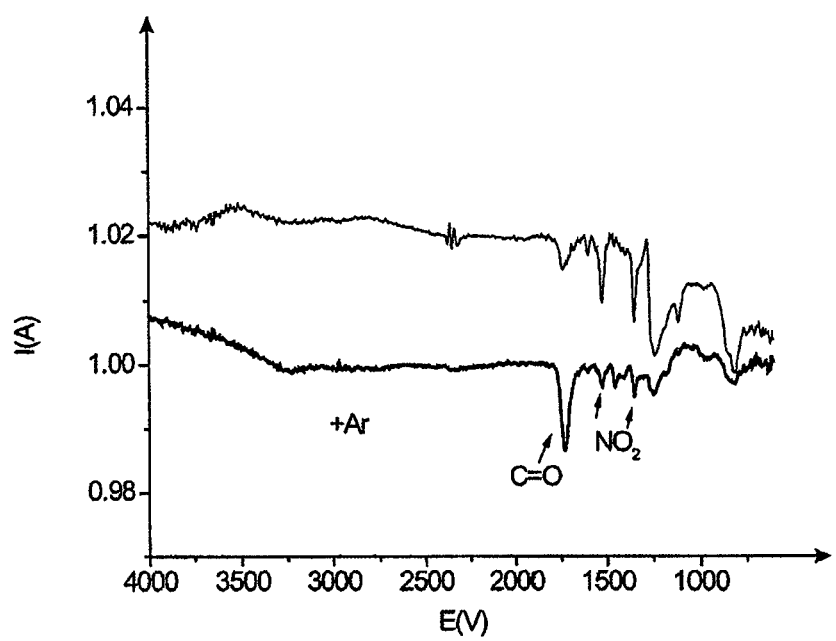

FIG. 4a shows that the reduction of the $N_2^+$ groups takes place at −0.7 V during the first voltage sweep. The FTIR analysis (FIG. 4b), from the spectrum taken after having subjected the plate to ultrasound treatment for 2 minutes in water, reveals the presence of polynitrophenylene ($NO_2$ bands at 1524 and 1350 cm$^{-1}$) and of polyacrylic acid (CO band of the carbonyl groups at 1725 cm$^{-1}$) on the plate.

Hydroxy Methacrylate (HEMA) in the Presence of the Diazonium Salt with a Polyacrylamide Gel A fraction of polyacrylamide gel synthesized according to the protocol described previously (rectangle of 1 cm by 2 cm and 1 cm in thickness) was immersed in an electrochemical solution for 30 minutes. The solution contains 20 ml of deionized water, 6.3 ml (2M) of HEMA, 0.130 g of NBDT (0.02M) and a drop of $H_2SO_4$ in the presence of argon sparging.

For the electrochemical study, 10 sweeps from −0.1 V to −1.8 V were carried out with a sweep rate of 10 mV/s.

Figure 5A:
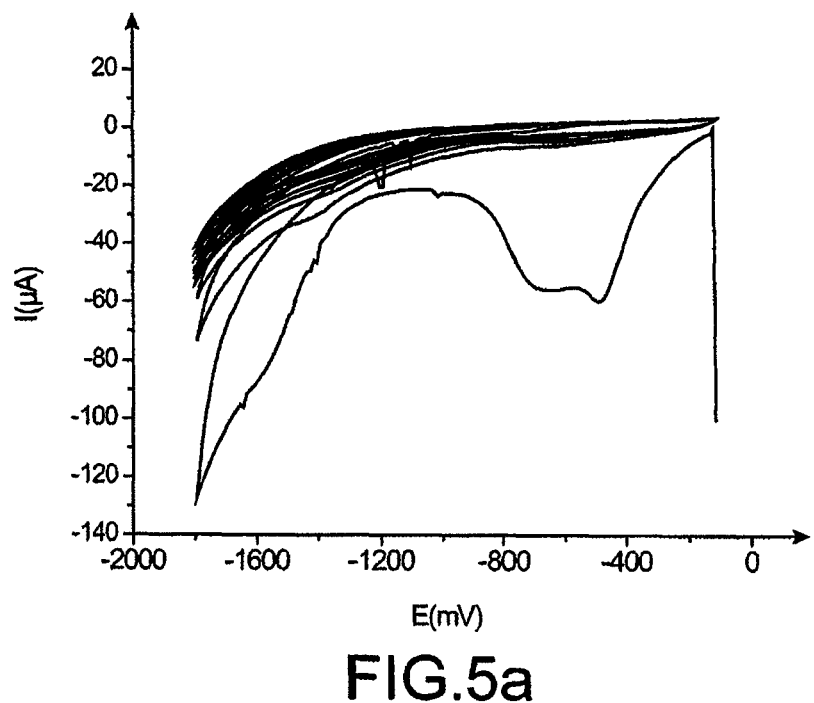
FIG. 5 presents a voltammogram of an aqueous acrylamide gel, containing hydroxyethyl methacrylate (HEMA) and NBDT, in contact with a gold surface (FIG. 5a) and an FTIR spectrum of the surface of the gold plate after electrolysis of the plate in the presence of an acrylamide gel containing HEMA and NBDT (FIG. 5b).
Figure 5B:
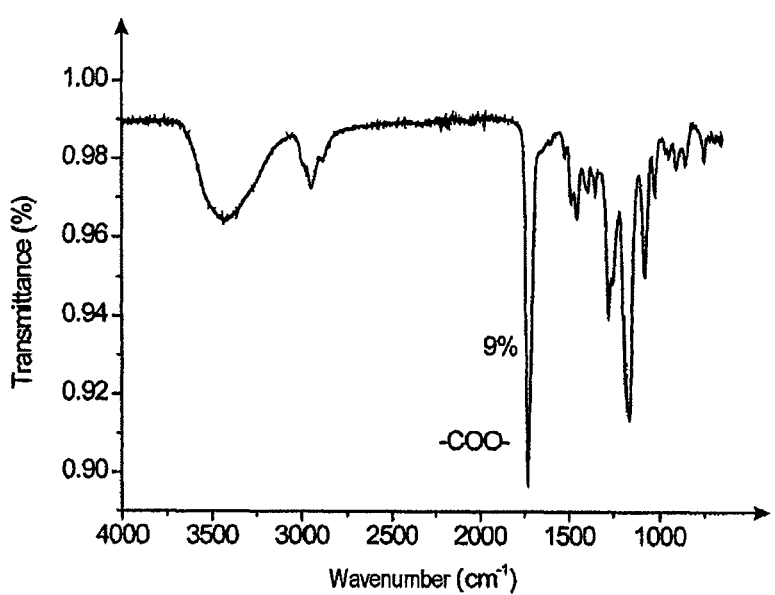

The voltammogram obtained is represented in FIG. 5a and the FTIR spectrum, taken after having subjected the plate to ultrasound treatment in water, is given in FIG. 5b.

In FIG. 5a, it is observed that the reduction of the $N_2^+$ groups takes place at −0.47 V and −0.66 V during the first cycle. The analysis of the plate by FTIR (FIG. 5b) shows the presence of the —COO— ester band characteristic of poly-HEMA at 1729 cm$^{-1}$.

This acrylamide gel makes it possible, like the agarose gel, to graft a polymeric organic film to a metallic substrate in an aqueous medium.

EXAMPLE 4

Thickness Control

In order to show that it is possible to obtain films of variable thickness by modifying the experimental conditions, two parameters were studied: the value of the final potential and the monomer concentration. The incidence of their variations on the thickness of the film was demonstrated by observing the changes in the value of the percentage transmittance of the carbonyl band at 1725 cm$^{-1}$ of the grafted polyacrylic acid. This value accounts for the thickness of grafted film, a high value corresponds to a thick film.

The type of film (acrylic acid and diazonium salt) used in Example 3 was used to illustrate this example.

Influence of the Final Potential

An agarose gel, as prepared in Example 1, was immersed in an electrochemical solution comprising $2 \times 10^{-1}$M of $Et_4NBF_4$, 3.7M of acid and $3 \times 10^{-2}$M of NBDT with argon sparging for around 3 h.

Figure 6:
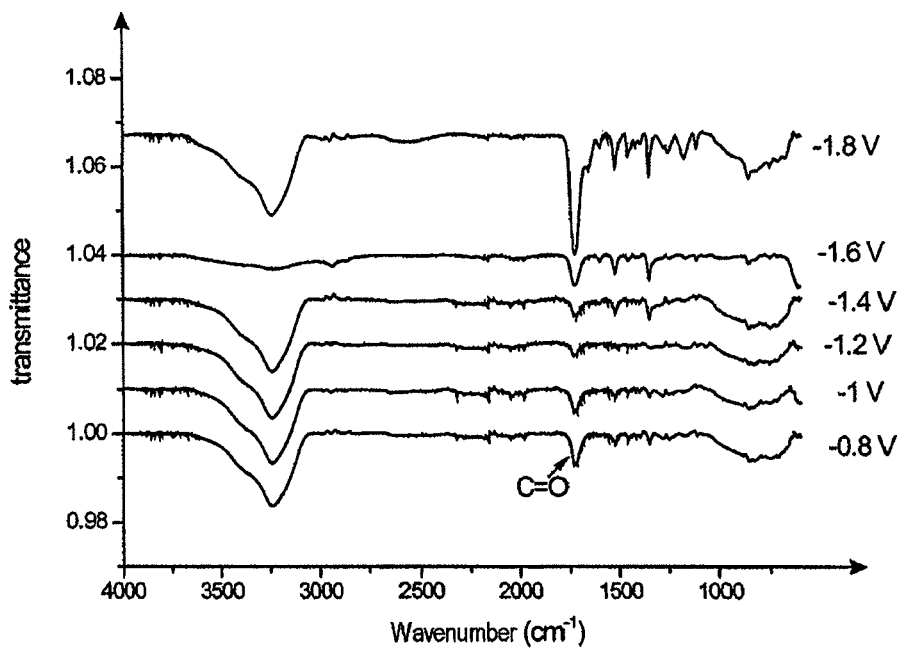
FIG. 6 presents the FTIR spectra obtained for various values of the voltage for one and the same gel.

Cycles of 10 sweeps from +0.084 V to different final potential values, of −0.8 V to −1.8 V, were carried out with a sweep rate of 10 mV/s on identical samples. The FTIR spectra obtained, after washing in water with ultrasound treatment for 2 minutes, are given in FIG. 6.

The highest percentage transmittance, for the CO band at 1725 cm$^{-1}$ of the carbonyl groups of the grafted polyacrylic acid, corresponds to the final potential of −1.8 V. It is by working at this potential that the thickest polyacrylic acid film is obtained. The expansion of the potential range leads to the reduction of $H^+$ protons, which leads to the release of H radicals in the gel. The latter, like the radicals of NBDT, initiate the polymerization, which increases the yield of polyacrylic acid grafted to the plate.

Influence of the Monomer Concentration

After having determined, at −1.8 V, the value of the final potential favourable to the increase of the yield of polyacrylic acid grafted to the plate, the influence of the concentration of acrylic acid in the solution was studied.

Three aqueous solutions each respectively containing 3.5M, 5.2M and 7.4M of acrylic acid, with concentrations of $2 \times 10^{-1}$M of $Et_4NBF_4$ and $3 \times 10^{-2}$M of NBDT for the other components, were prepared. In each of them, a gel as prepared in Example 1 was immersed for 3 hours in the presence of argon sparging.

Cycles of 10 sweeps from +0.084 V to −1.8 V were carried out with a sweep rate of 10 mV/s on each of the samples prepared.

Figure 7:
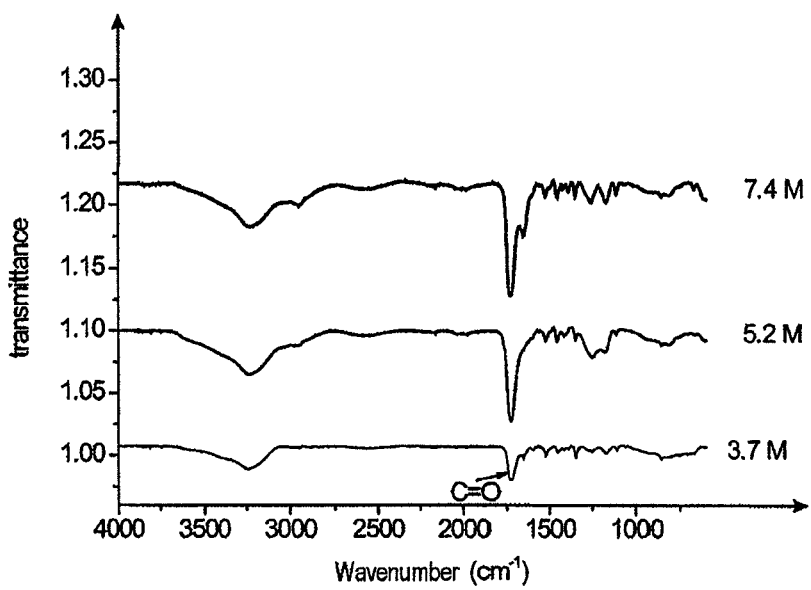
FIG. 7 presents the FTIR spectra obtained for various values of monomer concentration for one and the same gel.

The spectra recorded in FTIR, after washing in water with ultrasound treatment for 2 minutes, are given in FIG. 7.

The highest percentage transmittance, for the CO band at 1725 cm$^{-1}$ of the carbonyl groups of the grafted polyacrylic acid, corresponds to the concentration of 7.4M of acrylic acid in the solution.

Influence of the Degassing of the Water Before Production of the Gel

The gel was prepared under a stream of argon from deionized water, which was previously degassed, by argon sparging, for 3 h, according to the protocol from Example 1. The step of diffusion of the electrochemical solution in the gel and the preparation of the film (acrylic acid and diazonium salt) is similar to that which is presented in Example 3. The FTIR analysis of the film grafted after having subjected the gold plate to ultrasound treatment in deionized water shows that a thicker film is obtained than in the absence of degassing, specifically the percentage transmittance of the ester band of the polyacrylic acid is 10% greater.

EXAMPLE 5

Preparation of an Organic Colloidal System

Typically, in electrochemistry, the electrografting reactions are carried out in electrochemical cells with aprotic solvents such as acetonitrile or DMF.

Polymeric Film from the Primer Alone

A gel, prepared according to the protocol of Example 1, was immersed, with argon sparging for approximately 3 hours, in a solution of 75 mg (3×10$^{-2}$M) of NBDT and 440 mg (2×10$^{-1}$M) of Et$_4$NBF$_4$ in 10 ml of acetonitrile.

The electrochemical study was carried out by cyclic voltammetry by carrying out 10 sweeps from −0.01 V to −0.8 V at the rate of 10 mV/s.

Figure 8A:
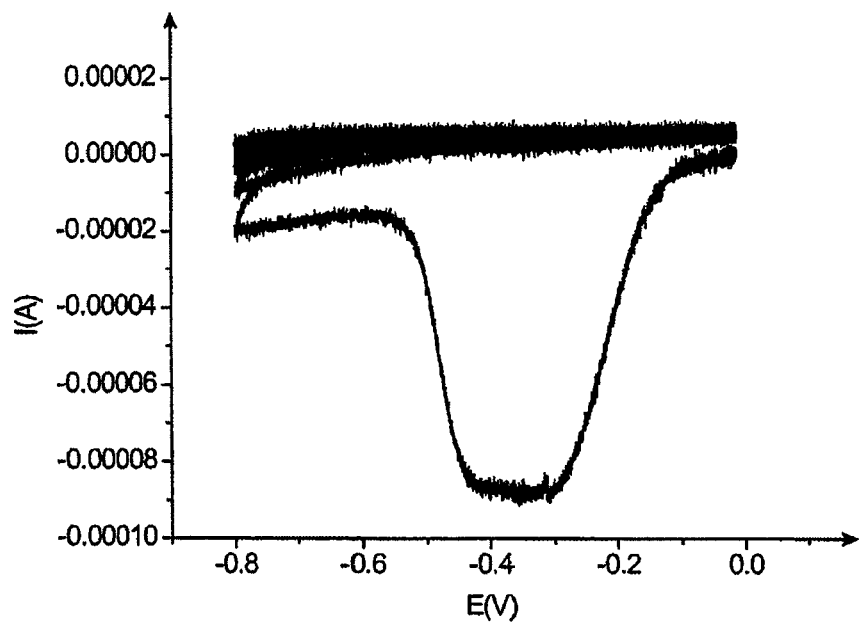
FIG. 8 presents a voltammogram of an agarose gel, containing acetonitrile and NBDT, in contact with a gold surface (FIG. 8a) and an FTIR spectrum of the surface of the gold plate after electrolysis in the presence of an agarose gel containing acetonitrile and NBDT (FIG. 8b).
Figure 8B:
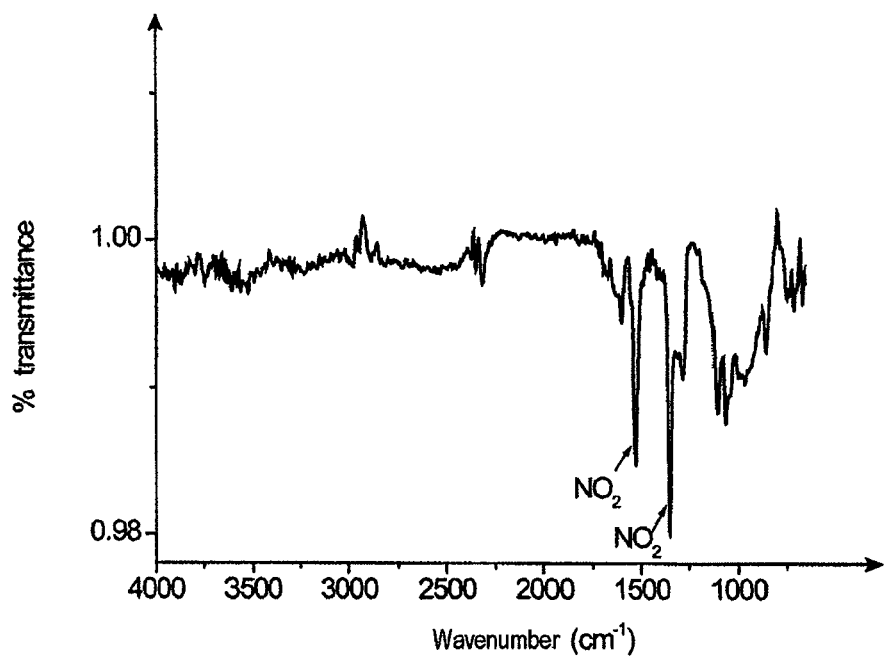

The voltammogram recorded is presented in FIG. 8a and the FTIR spectrum of the grafted film, produced after washing the plate in acetonitrile with ultrasound treatment for 2 minutes, is represented in FIG. 8b.

The reduction of the N$_2^+$ groups is observed at −0.35 V during the first cycle (FIG. 8a). The analysis of the plate by FTIR (FIG. 8b) shows the presence of NO$_2$ bands characteristic of polynitrophenylene at 1350 and 1528 cm$^{-1}$.

These results account for the possibility of using the agarose gel as an electrochemical cell in an organic medium.

Polymeric Film from the Primer and a Monomeric Species

The films presented below were prepared from a diazonium salt and from a vinyl monomer, butyl methacrylate (BuMA).

An electrochemical solution was produced by dissolving 75 mg (3×10$^{-2}$M) of NBDT, 440 mg (2×10$^{-1}$M) of Et$_4$NBF$_4$ in 10 ml of acetonitrile to which 3.2 ml (1.5M) of BuMA were added. An agarose gel, prepared according to Example 1, was then immersed in this solution, with argon sparging, for 3 hours.

The electrochemical study was carried out by cyclic voltammetry by making 10 sweeps from −0.1 V to −1 V at the rate of 10 mV/s.

Figure 9A:
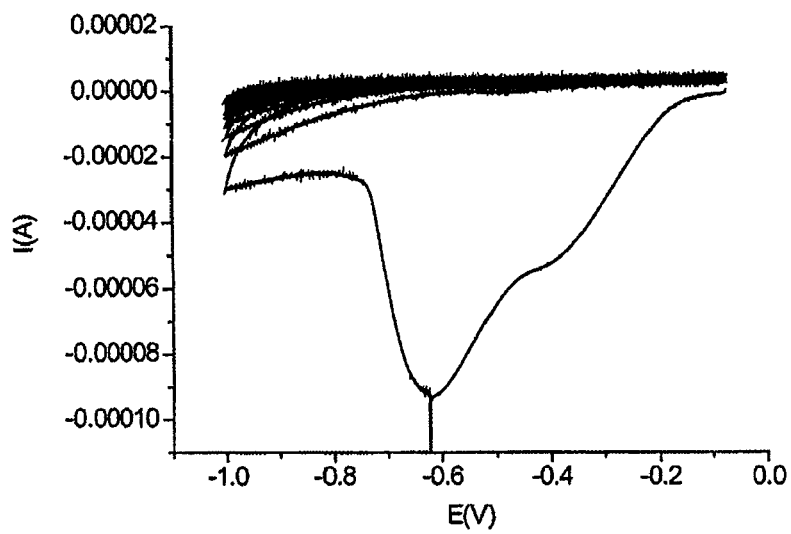
FIG. 9 presents a voltammogram of an agarose gel, containing acetonitrile, butyl methacrylate (BuMA) and NBDT, in contact with a gold surface (FIG. 9a) and an FTIR spectrum of the surface of the gold plate after electrolysis in the presence of an agarose gel containing acetonitrile, BuMA and NBDT (FIG. 9b).
Figure 9B:
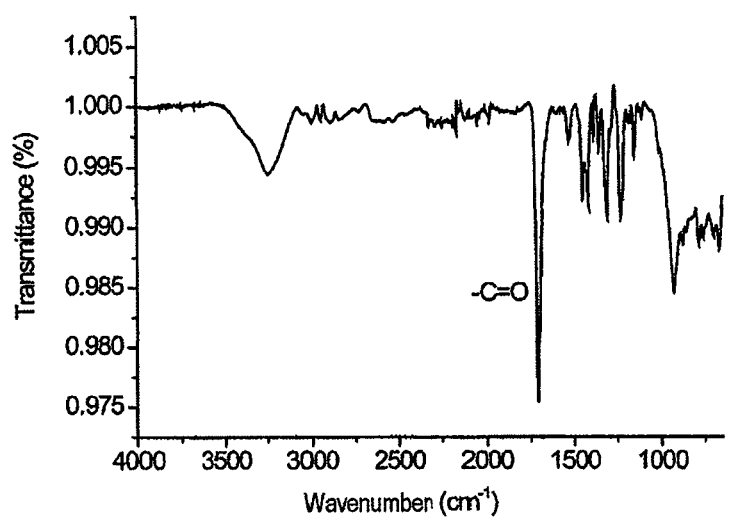

The voltammogram recorded is given in FIG. 9a and the FTIR spectrum of the grafted film, after washing in acetonitrile with ultrasound treatment for 2 minutes, is represented in FIG. 9b.

In FIG. 9a, it is observed that the reduction of the N$_2^+$ groups takes place at −0.35 V and at −0.6 V during the first cycle. The analysis of the plate by FTIR (FIG. 9b) shows the presence of the CO ester band characteristic of polyBuMA at 1708 cm$^{-1}$.

It is therefore possible to graft a polymer to a metallic substrate in an organic medium (solvent) using the process of the invention.

EXAMPLE 6

Emulsions

As surfactant compounds, it was decided to use sodium dodecylsulphate (SDS), which is available commercially at low cost.

The gel was prepared according to the protocol of Example 1.

Butyl Methacrylate Monomer

In order to show the application of the process to monomers that are insoluble in an aqueous medium, the electropolymerization in emulsion, applied to butyl methacrylate (BuMa), a vinyl monomer that is insoluble in water, was carried out.

An electrochemical solution was produced by dissolving 50 mg (4.9×10$^{-3}$M) of SDS in 20 ml of deionized water. After vigorous stirring for 15 minutes, 20 ml (3.1M) of BuMA were introduced and the stirring was continued for 15 minutes. Next, 10.5 mg (1.1×10$^{-3}$M) of NBDT and a drop of H$_2$SO$_4$ were added to the medium. After 15 minutes of stirring, an agarose gel, obtained according to the methods of Example 1, was immersed in the solution for 3 hours with argon sparging.

The electrochemical study was carried out by cyclic voltammetry by making 10 sweeps from −0.1 V to −1.8 V at the rate of 10 mV/s.

Figure 10A:
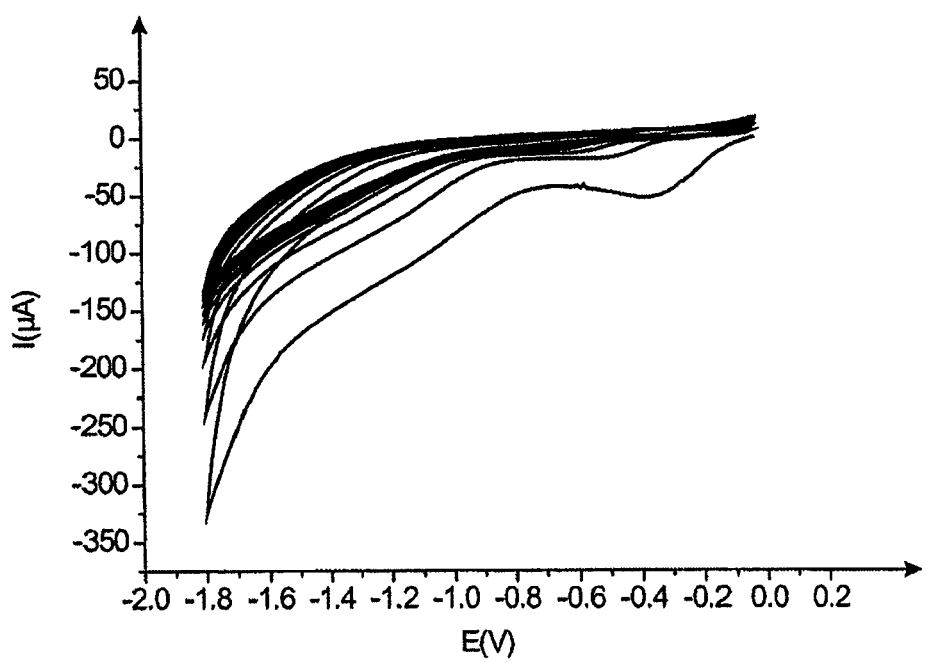
FIG. 10 presents a voltammogram of an aqueous agarose gel, containing NBDT, BuMA and a surfactant, in contact with a gold surface (FIG. 10a) and an FTIR spectrum of the surface of the gold plate after electrolysis in the presence of an aqueous agarose gel containing NBDT, BuMA and a surfactant before and after ultrasound treatment (+US) (FIG. 10b).
Figure 10B:
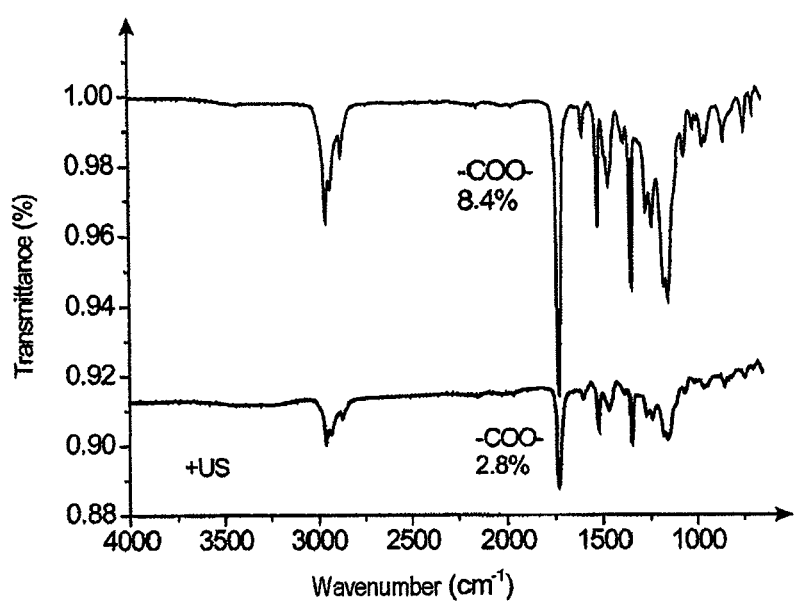

The voltammogram recorded is represented in FIG. 10a and the FTIR spectra of the film before and after washing in DMF (good solvent for the polymer) with ultrasound treatment (+US) for 2 minutes, are represented in FIG. 10b.

In FIG. 10a the reduction of the N$_2^+$ groups at −0.3 V during the first sweep cycle is seen. FIG. 10b shows the possibility of obtaining a thick film on gold plate (high transmittance value of the CO ester band) before the ultrasound treatment. The ultrasounds make it possible to retain only the fraction of grafted film and therefore the transmittance value is lower.

Vinyl Acetate Monomer

Vinyl acetate (VA) is also a monomer that is not very soluble in water, of chemical formula: CH$_3$COOCH=CH$_2$.

An electrochemical solution was produced by dissolving 50 mg (4.9×10$^{-3}$M) of SDS in 20 ml of deionized water. After vigorous stirring for 15 minutes, 8 ml (3.1M) of VA were introduced and the stirring was continued for 15 minutes. Next, 10.5 mg (1.1×10$^{-3}$M) of NBDT and a drop of H$_2$SO$_4$ were added to the medium. After 15 minutes of stirring, the gel was immersed in the solution for a duration of 30 minutes with argon sparging.

For the electrochemical study, 10 sweeps from −0.35 V to −1.8 V were carried out at the rate of 10 mV/s.

Figure 11A:
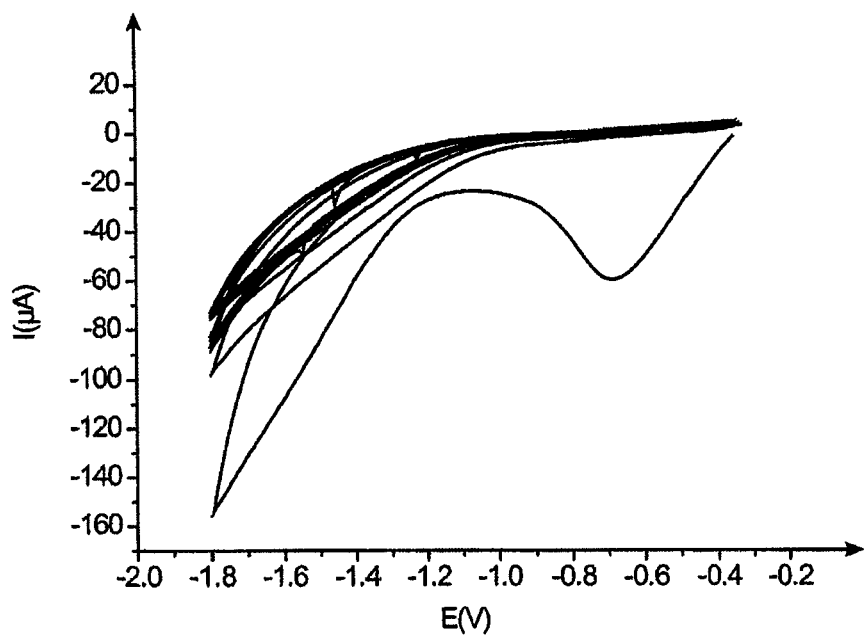
FIG. 11 presents a voltammogram of an aqueous agarose gel, containing NBDT, vinyl acetate (VA) and a surfactant, in contact with a gold surface (FIG. 11a) and an FTIR spectrum of the surface of the gold plate after electrolysis in the presence of an aqueous agarose gel containing NBDT, VA and a surfactant after ultrasound treatment (FIG. 11b).
Figure 11B:
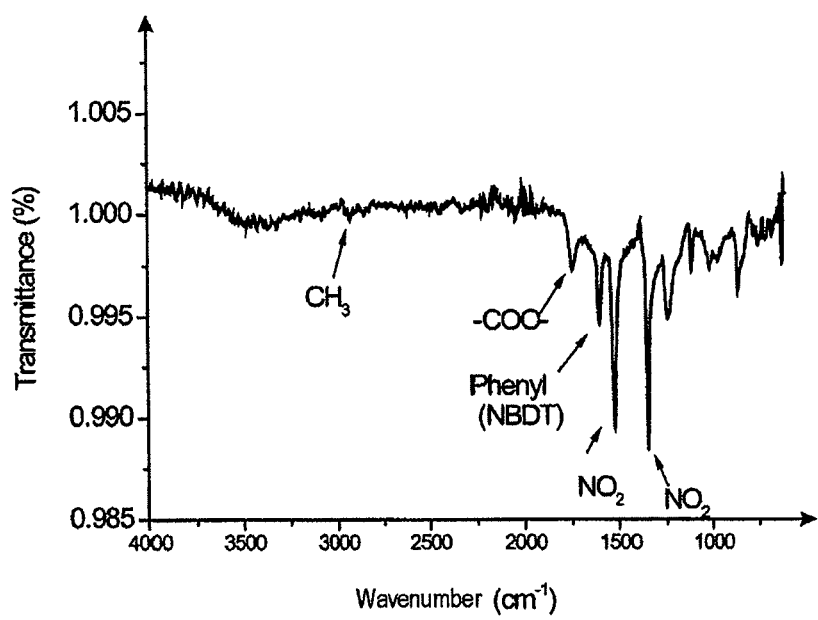

The voltammogram obtained is given in FIG. 11a and the FTIR spectrum of the film after washing in acetone (good solvent for the polymer) with ultrasound treatment for 2 minutes, is represented in FIG. 11b.

FIG. 11a shows that the reduction of the $N_2^+$ groups appears at −0.7 V during the first voltage sweep.

The FTIR analysis (FIG. 11b) from the spectrum taken after having subjected the plate to ultrasound treatment for 2 minutes in acetone (good solvent for the polyvinyl acetate), reveals the presence of polynitrophenylene (phenyl band at 1600 cm$^{-1}$ and nitro bands at 1524 and 1350 cm$^{-1}$) and of polyvinyl acetate (acetate band at 1743 cm$^{-1}$).

BuMa Monomer and Neutral Emulsifier: Polyglycol Lauryl Ether

A study identical to the previous one was carried out by changing the emulsifier. It is a non-ionic surfactant, polyglycol lauryl ether or Brij 35® ($C_{12}H_{26}(OC_2H_4)_nOH$), which was used.

The electrochemical solution therefore contained 56 mg ($4.9 \times 10^{-3}$M)) of Brij 35® in 20 ml of deionized water. After vigorous stirring for 15 minutes, 20 ml (3.1M) of BuMA were introduced and the stirring was continued for 15 minutes. Next, 10.5 mg ($1.1 \times 10^{-3}$M) of NBDT and a drop of $H_2SO_4$ were added to the medium. After 15 minutes of stirring, the gel was immersed in the solution for a duration of 30 minutes with argon sparging.

For the electrochemical study, 10 sweeps from −0.1 V to −1.8 V were carried out at the rate of 10 mV/s.

Figure 12A:
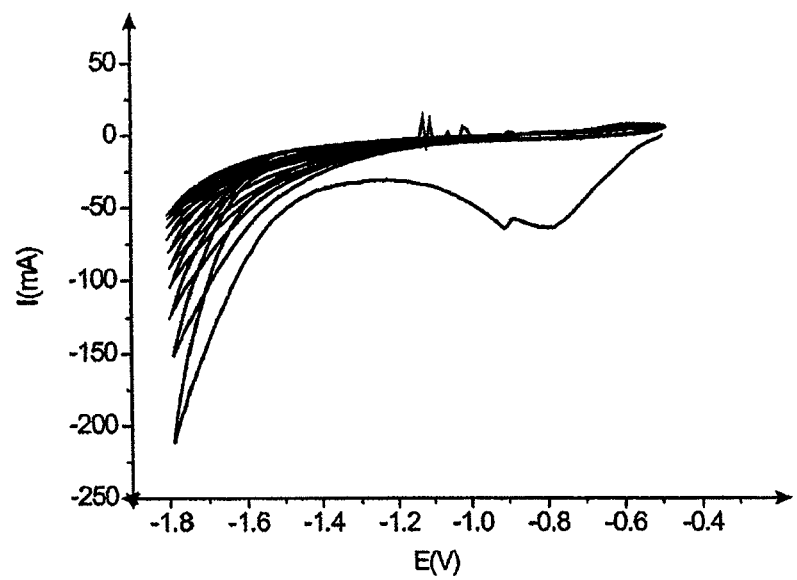
FIG. 12 presents a voltammogram of an aqueous agarose gel, containing NBDT, BuMA and a neutral surfactant, in contact with a gold surface (FIG. 12a) and an FTIR spectrum of the surface of the gold plate after electrolysis in the presence of an aqueous agarose gel containing NBDT, BuMA and a neutral surfactant after ultrasound treatment (FIG. 12b).
Figure 12B:
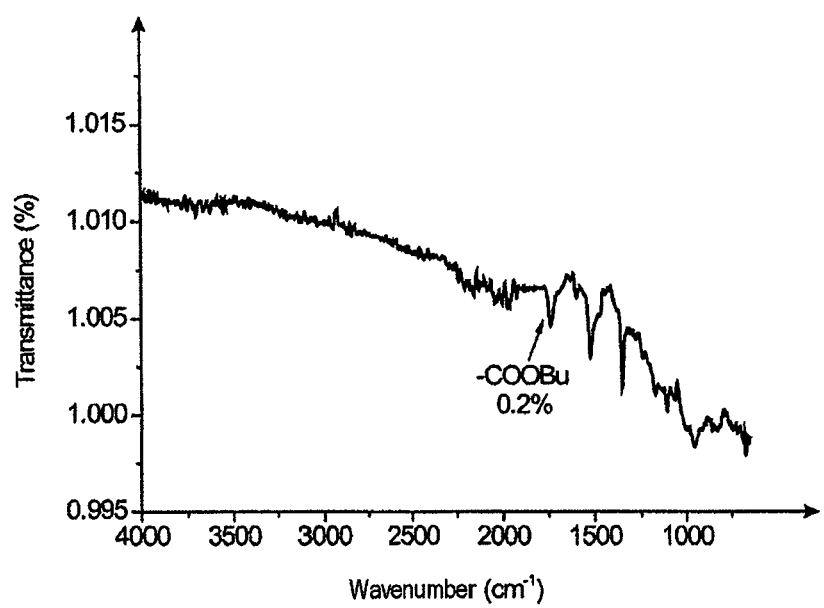

The voltammogram recorded is given in FIG. 12a and the FTIR spectra of the film after washing in DMF with ultrasound treatment for 2 minutes, are represented in FIG. 12b.

In FIG. 12a, the reduction of the $N_2^+$ groups appears at −0.8 V during the first sweep cycle. FIG. 12b shows the FTIR spectrum of polyBuMA with a low transmittance value for the ester groups. The neutral surfactant made it possible to obtain a thinner film than the anionic surfactant used under the same conditions.

EXAMPLE 7

Morphology of the System Macroscopic Morphology

This example aims to prove that the grafting takes place only in the zone of contact between the electrode and the colloidal system, as in the case of microcontact printing (Xia Y. Whitesides G. M., "Soft lithography", Angew. Chem. Int. Ed. Engl., 1998, 37, 550).

For the creation of a pattern, the still hot gel, as presented in Example 1, was poured into a Teflon mould in which a cruciform relief had been made. The gel was then immersed, for 3 hours in the presence of argon sparging, into an electrochemical solution containing 0.0632 g ($1.3 \times 10^{-2}$M) of NBDT, 6.3 ml (2.5M) of hydroxyethyl methacrylate (HEMA), a monomer soluble in an aqueous medium.

The electrochemical study was carried out by cyclic voltammetry by making 10 sweeps from −0.1 V to −1.8 V at the rate of 10 mV/s.

The treated plate was subjected to ultrasound treatment in DMF for 2 minutes, then was immersed in an iodized aqueous solution which makes it possible to better visualize the 10 mm long and 1 mm high pattern.

Figure 13:
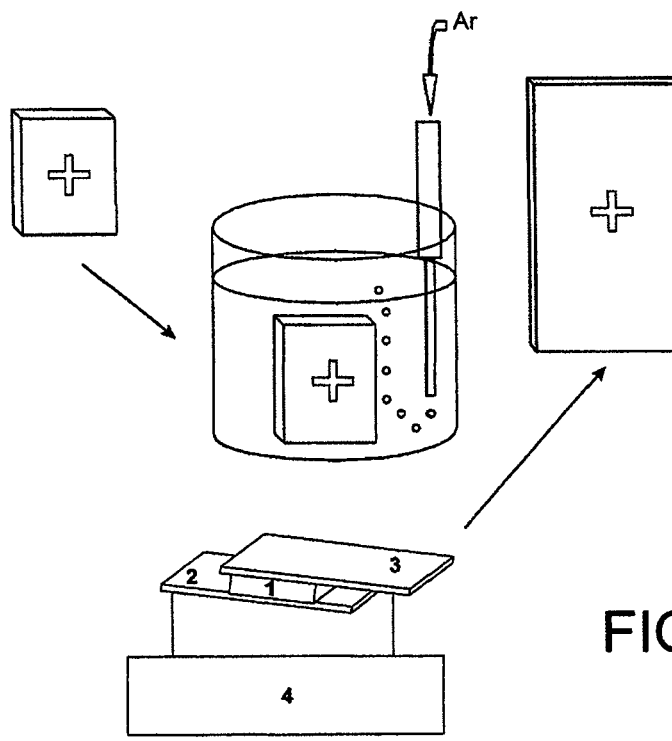
FIG. 13 is a schematic representation of the various steps for obtaining a grafted cross on gold plate (arms of 10 mm and thickness of 1 mm).

Represented in FIG. 13 is the gel with the imprinted pattern and also the various steps which led to the pattern grafted on the gold plate.

Morphology at Submacroscopic Scales

The preceding examples made it possible, in particular, to show that the colloidal systems according to the invention, such as a gel, and especially agarose gel, behave as an electrochemical cell. The application of the process to such systems makes it possible to graft, in an aqueous or organic medium, polymeric films of around 30 nm (measured with a profilometer) to electrically conductive or semiconductive surfaces, such as gold surfaces.

It has also been shown that, in a simple and effective manner, it was possible to obtain copolymeric films by implementing the process. Moreover, it has been shown that the process could also involve emulsions, especially when a water-insoluble vinyl monomer must be used.

Furthermore, it appears that the process provides the advantage of being able to locally graft, with a chosen topography of variable scale, a polymer film to a surface.

The agarose gel which illustrates the examples behaves as a product suitable for producing the grafting of a polymer film outside of a glovebox, on a transportable or non-transportable metallic substrate, in a vertical or horizontal position. The production of the gel is easy and furthermore it is a non-toxic product. Its use in an aqueous medium with a monomer that is soluble or insoluble (emulsion) is also favorable for industrial exploitation.

EXAMPLE 8

Reproducibility

For this study, an agarose gel prepared according to Example 1 was used. As before, this study was carried out with acrylic acid and the diazonium salt under the same conditions as in Example 3. After having immersed the agarose gel in the electrochemical solution for 30 minutes in the presence of argon sparging, it was subjected to several series of 10 voltammetry cycles. For this, a different gold plate was used after each series and the gel was not brought back into contact with the electrochemical solution.

Figure 14:
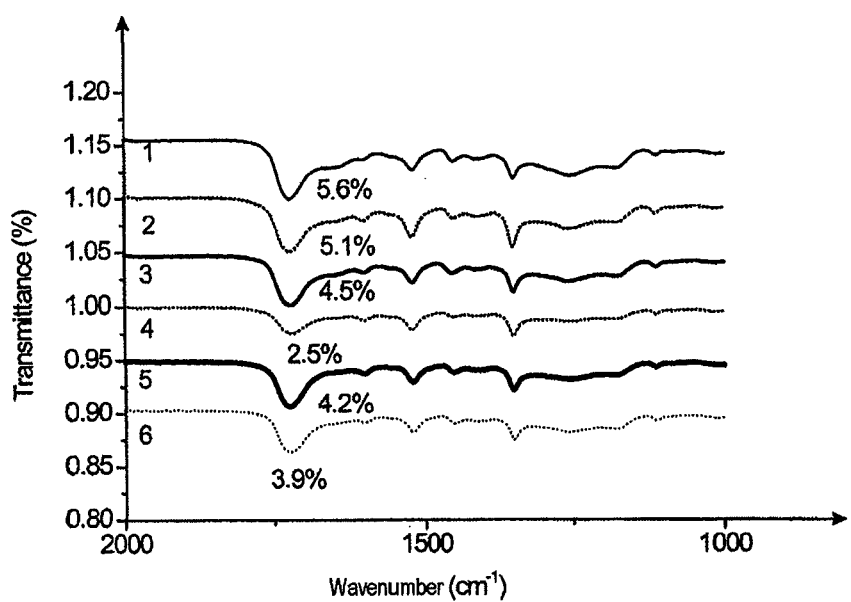
FIG. 14 presents the FTIR spectra obtained after use of an agarose gel brought into contact with the electrochemical solution a single time before the first series of 10 voltammetry cycles.

The FTIR spectra, taken after having subjected the plates to ultrasound treatment in water for 2 minutes, are represented in FIG. 14. The results indicate that the gel may be used several times while resulting in films of suitable thickness.

The invention claimed is:

1. A method for forming an organic film on an electrically conductive or semiconductive surface, the method comprising:
    applying an electric potential between a gel, in contact with said surface, and said surface, wherein the gel comprises
        a protic solvent;
        at least one compound having colloidal properties; and
        at least one adhesion primer,
        wherein the electric potential applied is at least equal to a reduction potential of the adhesion primer.

2. The method according to claim 1, wherein said protic solvent is chosen from the group consisting of water, acetic acid, hydroxylated solvents, liquid glycols, and mixtures thereof.

3. The method according to claim 1, wherein said protic solvent is water.

4. The method according to claim 1, wherein said adhesion primer is a cleavable aryl salt chosen from the group consisting of aryl diazonium salts, aryl ammonium salts, aryl phosphonium salts and aryl sulphonium salts.

5. The method according to claim 1, wherein said adhesion primer is a cleavable aryl salt of formula (I):

in which:
    A represents a monovalent anion; and
    R represents an aryl group.

6. The method according to claim 5, wherein R is chosen from aryl groups substituted by electron-withdrawing groups such as $NO_2$, COH, ketones, CN, $CO_2H$, $NH_2$, esters and halogens.

7. The method according to claim 5, wherein said adhesion primer is chosen from the group consisting of phenyldiazonium tetrafluoroborate, 4-nitrophenyldiazonium tetrafluoroborate, 4-bromophenyldiazonium tetrafluoroborate, 4-aminophenyldiazonium chloride, 2-methyl-4-chlorophenyldiazonium chloride, 4-benzoylbenzenediazonium tetrafluoroborate, 4-cyanophenyldiazonium tetrafluoroborate, 4-carboxyphenyldiazonium tetrafluoroborate, 4-acetamidophenyldiazonium tetrafluoroborate, 4-phenylacetic acid diazonium tetrafluoroborate, 2-methyl-4-[(2-methylphenyl)diazenyl]benzenediazonium sulphate, 9,10-dioxo-9,10-dihydro-1-anthracenediazonium chloride, 4-nitro-naphthalenediazonium tetrafluoroborate and naphthalenediazonium tetrafluoroborate.

8. The method according to claim 5, wherein the pH within the gel is between 0 and 3.

9. The method according to claim 1, wherein said compound having colloidal properties is an organic polymer.

10. The method according to claim 9, wherein said organic polymer is chosen from polysaccharides, and polyacrylamide and its derivatives.

11. The method according to either claim 9, wherein said organic polymer is chosen from agarose, chitosan, xanthan, carrageenan, agar, alginate and mixtures thereof.

12. The method according to claim 1, wherein said potential is applied by polarization under linear or cyclic voltammetry conditions, under potentiostatic, potentiodynamic, intensiostatic, galvanostatic or galvanodynamic conditions or by simple or pulse chronoamperometry.

13. The method according to claim 1, wherein said gel furthermore comprises at least one radical-polymerizable monomer different from the adhesion primer.

14. The method according to claim 13, wherein said monomer is of formula (II) below:

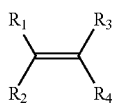

(II)

in which the $R_1$ to $R_4$ groups, which are identical or different, represent a non-metallic monovalent atom such as a halogen atom or a hydrogen atom, or a saturated or unsaturated chemical group, such as a carbon-based structure and especially an alkyl or aryl group, a —$COOR_5$ group in which $R_5$ represents a hydrogen atom or a $C_1$-$C_6$ alkyl, nitrile, carbonyl, amine or amide group.

15. The method according to claim 13, wherein said monomer is chosen from acrylic acid, vinyl acetate, acrylonitrile, methacrylonitrile, methyl methacrylate, ethyl methacrylate, butyl methacrylate, propyl methacrylate, hydroxyethyl methacrylate (HEMA), hydroxypropyl methacrylate, glycidyl methacrylate; acrylamides and especially amino-ethyl, propyl, butyl, pentyl and hexyl methacrylamides, cyanoacrylates, diacrylates and dimethacrylates, triacrylates and trimethacrylates, tetraacrylates and tetramethacrylates (such as pentaerythritol tetramethacrylate), styrene and its derivatives, para-chlorostyrene, pentafluoro-styrene, N-vinyl pyrrolidone, 4-vinyl pyridine, 2-vinyl pyridine, vinyl, acryloyl or methacryloyl halides, and di-vinylbenzene (DVB).

16. The method according to claim 1, wherein said gel comprises a surfactant.

17. The method according to claim 1, wherein said gel comprises at least one electrolyte chosen from quaternary ammonium perchlorates, tosylates, tetrafluoroborates, hexafluorophosphates or halides, sodium nitrate and sodium chloride.

18. The method according to claim 1, further comprising:
preparing the gel from at least one compound having colloidal properties and from the protic solvent; and
performing diffusion of at least one adhesion primer in the gel.

19. The method according to claim 1, further comprising:
preparing the gel from at least one compound having colloidal properties, from a protic solvent, and from at least one adhesion primer.

20. The method according to claim 1, wherein said gel has a chosen morphology.

21. The method according to claim 18, wherein said step of performing diffusion further comprises performing diffusion of at least one monomer in the gel.

22. The method according to claim 19, wherein said step of preparing the gel further comprises preparing the gel from at least one monomer in the gel.

* * * * *